United States Patent [19]

Marcovitz et al.

[11] 3,759,336
[45] Sept. 18, 1973

[54] INTERCHANGEABLE POWER OPERATED TOOLS

[76] Inventors: David Louis Marcovitz, 2022 Valencia St.; Harold Ray Vocker, 109 Kentucky St., both of Monroe, La. 71201

[22] Filed: Jan. 21, 1972

[21] Appl. No.: 219,682

[52] U.S. Cl.................. 173/163, 173/170, 279/1 B, 408/20
[51] Int. Cl............................................ B23b 45/14
[58] Field of Search.............................. 173/163, 29; 287/DIG. 7, 53 SS; 279/19.6, 1 B; 408/20, 21; 64/4

[56] References Cited
UNITED STATES PATENTS

| | | | |
|---|---|---|---|
| 3,165,325 | 1/1965 | Goepfrich et al............... | 173/163 X |
| 1,882,520 | 10/1932 | Pollard........................... | 287/DIG. 7 |
| 2,925,690 | 2/1960 | Dayton et al. .................. | 408/20 X |
| 2,345,910 | 4/1944 | Fawcett........................... | 287/53 SS |
| 2,539,003 | 1/1951 | Agustoni......................... | 408/20 UX |
| 2,303,565 | 12/1942 | Luna................................... | 173/163 |
| 2,760,258 | 8/1956 | Rieger.............................. | 287/DIG. 7 |
| 2,977,807 | 4/1901 | Conover .......................... | 64/4 X |
| 2,458,714 | 1/1949 | Mahoney ........................ | 287/DIG. 7 |

FOREIGN PATENTS OR APPLICATIONS 415,993    11/1946    Italy................................ 287/53 SS Primary Examiner—Marvin A. Champion
Assistant Examiner—William F. Pate, III
Attorney—Revere B. Gurley

[57] ABSTRACT

Power operated tools of several types may be detachably connected to a portable power unit by means of complementary coupling members on each tool and a power unit. The coupling members in the form of collars on the power unit and a tool telescope together and the driving shaft of the power unit moves axially into driving engagement with a driven shaft of the tool. A detachable, spring biased fastener provides for quickly changing from one tool mounted on the power unit to a tool of another type.

2 Claims, 4 Drawing Figures

Patented Sept. 18, 1973

Patented Sept. 18, 1973 3,759,336

INTERCHANGEABLE POWER OPERATED TOOLS

NATURE AND OBJECT OF INVENTION

This invention relates to portable, manually controlled power tools. This development is especially concerned with mounting detachably any one of a plurality of power operated tools on a single, common power unit.

The object of this invention is to provide for interchangeably connecting any of several power operated tools to a single hand-controlled power unit. The power source within the power unit may be electric, pneumatic or hydraulic and may be controlled manually. Any one of a number of tools of different types may be selectively coupled to the power unit for operation by the power source, a readily separable coupling between the power unit and tool constituting a feature of this invention.

The power unit includes a source of power enclosed in a casing with a handle fixed to the casing, a control for the power source convenient to the handle and a driving shaft operated by the power source. The tool may be any type of tool which is operated by a driven shaft, such as an impact wrench, shown here, a chain saw, a rod or wire brush cleaner of the type patented to Vocker and Marcovitz in U.S. Pat. No. 3,621,505, granted Nov. 23, 1971, or other type of rotary operated tool.

The invention resides in a coupling means by which any selected tool can be connected to the power unit, with the shafts axially engaged so the driving shaft will drive the driven operating shaft of the tool. For this purpose, the casing of the power unit carries an extension adjacent the driving shaft and each tool carries a complementary extension adapted to engage the extension on the casing, with provision for securing these extensions together with the shafts engaged.

In the structure illustrated as embodying the invention, the extension on the casing is formed as a collar or sleeve surrounding the driving shaft with bearings for the shaft therein. The extension on each tool is also in the form of a collar or sleeve surrounding the driven shaft of the tool and having bearings for the driven shaft. The two collars or sleeves are formed with telescoping ends, and a spring fastener serves to connect these ends when the two collars or sleeves are assembled, with the two shafts in engagement to drive the shaft of the tool by the power source.

DRAWINGS

GENERAL DESCRIPTION

Figure 1:
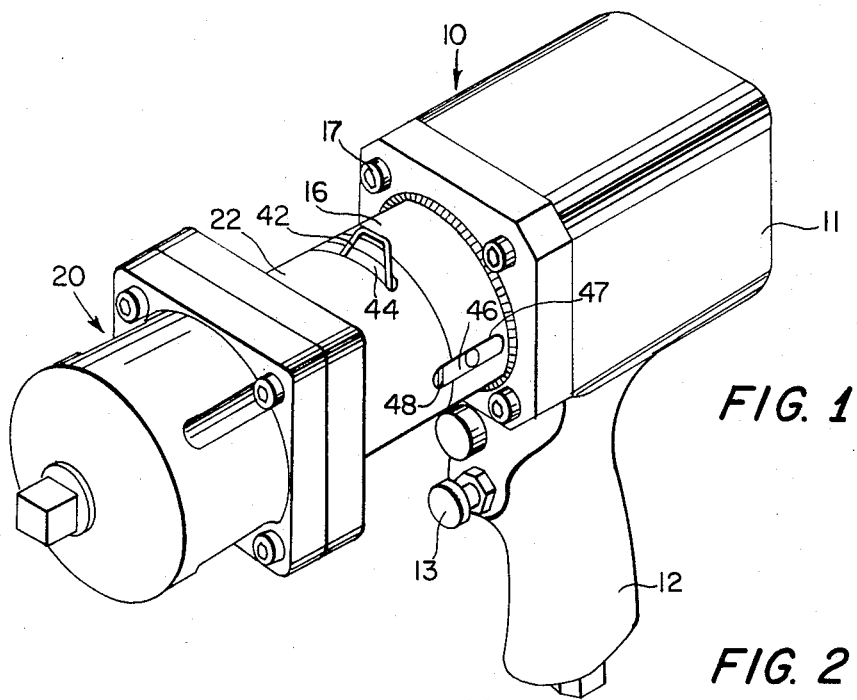
FIG. 1 is a perspective view of the assembled power unit and a tool driven by the power source.

The power unit 10 of this invention comprises a casing 11 having a handle 12 and enclosing a power source which may be energized by a control element 13. This power source may be of any conventional type, as electrical, pneumatic or hydraulic, or any other which may be conveniently mounted in a portable unit.

The power source operates a shaft 14, which may be connected to any of several detachable tools to operate such tool. A coupling member 16 in the form of a collar or sleeve is fixed to the casing, as at 17, surrounding the driving shaft 14. Bearings 18 in the coupling member provide support for the shaft 14.

Any type of tool 20 which can be driven by a rotary shaft may be mounted on the power unit, such as an impact wrench, illustrated herein, or a chain saw, or a dual brush mechanism such as shown in above U.S. Pat. No. 3,621,505. A coupling member, such as collar or sleeve 22, is fixed to the tool, as at 23, with a formation complementary to the formation of coupling member 16 fixed to the power unit. This coupling member 22 on the tool here shown as a collar or sleeve, is coaxial with the driven shaft 24 of the tool and provided with bearings 26 to support the driven shaft.

The coupling members 16 and 22 are formed with complementary male and female telescoping formations, the male formation 28 fitting within the female formation 30 to position the tool 20 accurately on the power unit 10. The driving and driven shafts have axially engaging drive connections at 32, 34, which are in driving engagement when the coupling member of the tool is axially telescoped on the coupling member 16 of the power unit 10.

A quick-acting fastening means secures the members 16 and 22 together automatically when the members are telescoped. For this purpose, the external periphery of the male formation 28 has a semi-groove 36 therein and the internal periphery of the female formation has a semi-groove 38, the two semi-grooves being complementary to form a circular passage when the formations are telescoped. A circumferential coil spring 40 is positioned in the passage, with one end 42 extended through a slot 44 in the wall of the female formation 30. This slot is large enough for the coils of the spring to pass through.

The tool 20 may be quickly removed by pulling on the end 42 of the split coil spring 40 and removing the spring through the slot 44. To mount another tool, the spring is reinserted in the internal semi-groove 38 of the female formation, and the tool may be mounted by telescoping the two coupling members together, the springs resiliently connecting the members.

In some types of tools, the coupling members must be accurately circumferentially positioned. The location of the tool may be fixed by a lug 46 detachably in a notch 47 on one coupling member, this lug engaging in a notch 48 on the other coupling member.

Figure 2:
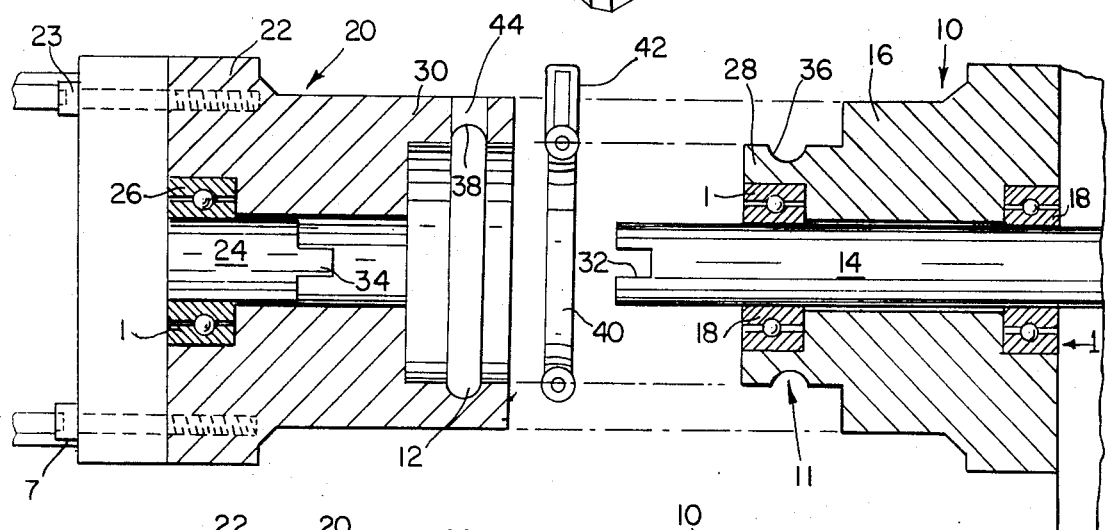
FIG. 2 is an exploded, longitudinal sectional view of the coupling members of the power unit and tool, and the fastening element.
Figure 3:
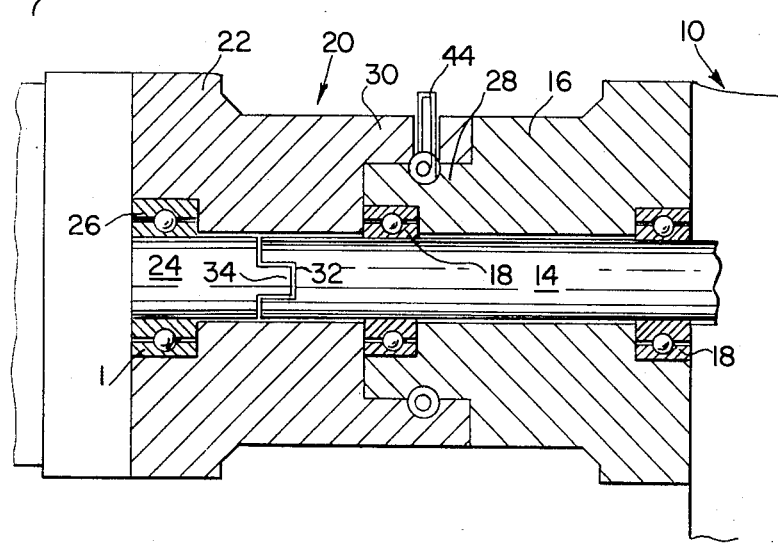
FIG. 3 is a fragmentary sectional view of the coupling members in assembled position.
Figure 4:
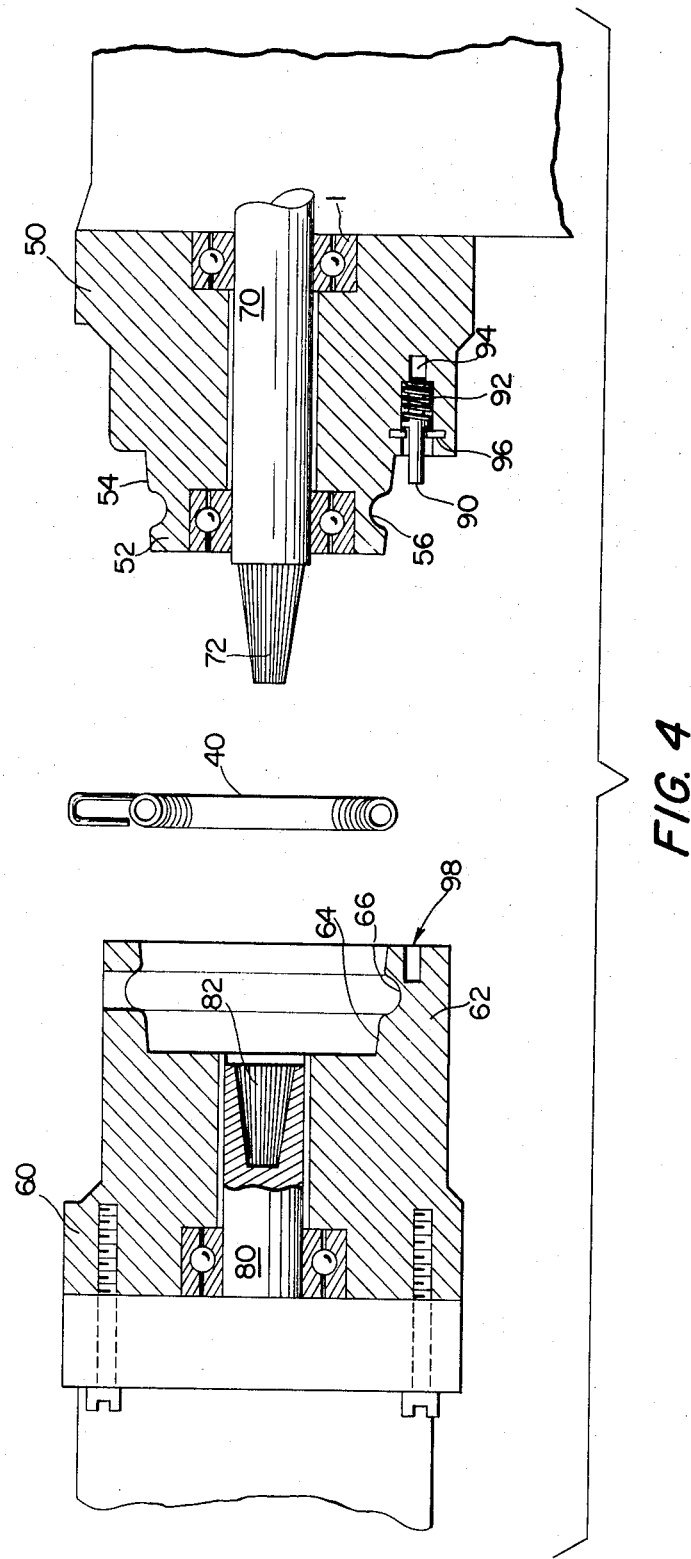
FIG. 4 is an exploded view in cross section of a modified form of the invention.

In the modified form of coupling in FIG. 4, the coupling members 50, 60 have tapered, telescoping formations. Thus the male formation 52 on coupling member 50 is tapered outwardly as at 54, and the female formation 62 has an inclined or conical wall as at 64. The grooves 56, 66 in the two formations receive a spring 40, as in FIGS. 1 to 3, to secure the tool and power unit together.

The driving shaft 70 and driven shaft 80 are formed with inclined spline drive connections as at 72, 82, the male spline connection 72 on driving shaft 70 fitting the conical spline recess 82 in driven shaft 80.

To position the couplings angularly, a locating pin 90 on one coupling 50 is spring mounted at 92 and held in its socket 94 by a transverse pin 96. A socket 98 on the opposite coupling member 60 receives the pin and locates the two coupling members relatively to each other.

Any type of shaft-operated tool may be mounted on a power unit by use of the coupling members here illustrated. The detachable fastening means enables the tools to be quickly interchanged, so that a number of tools may be operated by a single power unit, with no loss of time in changing tools.

We claim:

1. In a power tool in which any of several portable tools may be mounted on and coupled selectively to a portable power unit, said power unit comprising a casing having a power source, a handle and a manual element adjacent said handle to control said power source, a driving shaft extending from said casing and operated by said power source, and a coupling thereon comprising a separately formed collar fastened to said casing coaxial with said driving shaft and having bearings for said driving shaft, and a tool having a driven shaft for operating said tool, a coupling thereon comprising a separately formed collar fastened to said tool coaxial with said driven shaft and having bearings for said driven shaft, said shafts having axially engageable drive connections interengageable for driving said driven shaft by said driving shaft, said collars having coaxial, complementary, axially telescoping coupling formations to secure said tool on said power unit with said shafts in driving engagement when said collars are telescoped together, and spring biased fastener means to fasten said collars in assembled relation.

2. In a power tool as claimed in claim 1, in which the collar having the male coupling telescoping formation is fastened on the power unit and the shaft extending beyond the coupling formation has bearings at the inner and outer ends of the collar, so that the shaft on the power unit extends within the female coupling telescoping formation on the tool to engage the shorter shaft on the tool.

* * * * *